United States Patent [19]
McSorley et al.
[11] 3,838,419
[45] Sept. 24, 1974

[54] SECURITY ALARM SYSTEM WITH FAULT INDICATION

[75] Inventors: David J. McSorley, Twickenham; Jaye De Croos, Banstead, both of England

[73] Assignee: Alarm Equipment Supplies Limited, Twickenham, Middlesex, England

[22] Filed: Apr. 17, 1973

[21] Appl. No.: 351,881

[52] U.S. Cl. ............ 340/409, 340/408, 340/152 T, 343/6.8 R
[51] Int. Cl. .......................................... G08b 29/00
[58] Field of Search .... 340/409, 408, 152 T, 253 P, 340/214, 411; 179/175.31 R; 178/69 A; 343/6.5, 6.8

[56] References Cited

UNITED STATES PATENTS

| | | | |
|---|---|---|---|
| 3,508,260 | 4/1970 | Stein | 340/408 |
| 3,678,222 | 7/1972 | Boehly | 179/175.31 |
| 3,697,984 | 10/1972 | Atkinson et al. | 340/408 |
| 3,718,778 | 2/1973 | Anderson | 178/69 A |

*Primary Examiner*—John W. Caldwell
*Assistant Examiner*—Richard P. Lange
*Attorney, Agent, or Firm*—Kemon, Palmer & Estabrook

[57] ABSTRACT

A data signalling system includes a transponder at each end of a transmission line, a first of the transponders including means for transmitting an intermittent signal to the second transponder and the second transponder including means responsive to the termination of an incoming signal from the first transponder for transmitting a corresponding answer signal back to the first transponder in the gap before the next incoming signal. The two transponders therefore form a closed loop line monitoring system in which a genuine line fault is detected by the absence of an incoming signal at both ends of the line. The system is particularly useful in security alarm systems.

4 Claims, 2 Drawing Figures

SECURITY ALARM SYSTEM WITH FAULT INDICATION

An important requirement of any multi-line security alarm system where alarm signals are transmitted from different remote stations to a central control station is that each line should be continuously monitored for line faults, and that only genuine line faults should be detected. In other words, it should not be possible for a person wishing to break the alarm system to simulate a line fault. This can easily result in the security officers becoming confused between genuine line faults, simulated line faults, and alarm inputs. At the same time, a line monitoring system should not be so complicated that faults are likely to develop in the system itself.

In accordance with the present invention a data signalling system includes a transponder at each end of a transmission line, a first of the transponders including means for transmitting an intermittent signal to the second transponder and the second transponder including means responsive to the termination of an incoming signal from the first transponder for transmitting a corresponding anser signal back to the first transponder in the gap before the next incoming signal whereby the two transponders form a closed loop line monitoring system in which a genuine line fault is detected by the absence of an incoming signal at both ends of the line.

In a preferred embodiment of the invention the intermittent signal comprises intermittent bursts of pulses and each transponder includes a pump circuit which generates an output whenever the correct number of bursts of pulses have been received. The output of the pump circuit in the second transponder enables a gate to energise a timer which controls the transmission of corresponding bursts of pulses back to the first transponder. In both transponders the output of the pump circuit also clears a delay circuit which otherwise operates a line fault indicator at the end of the predetermined transmission period.

Figure 1:
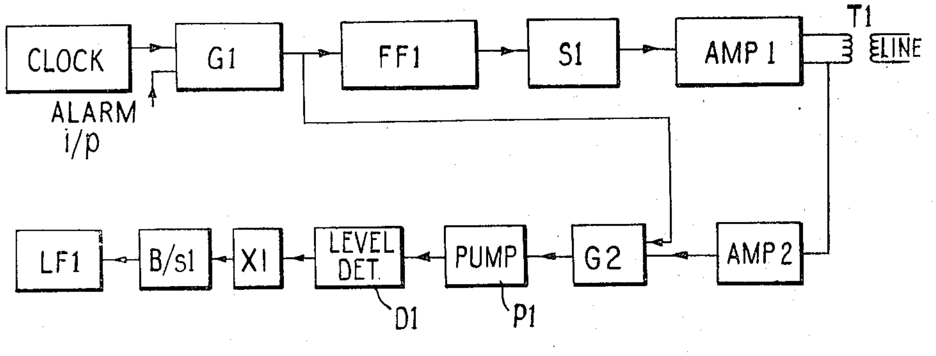
Figure 2:
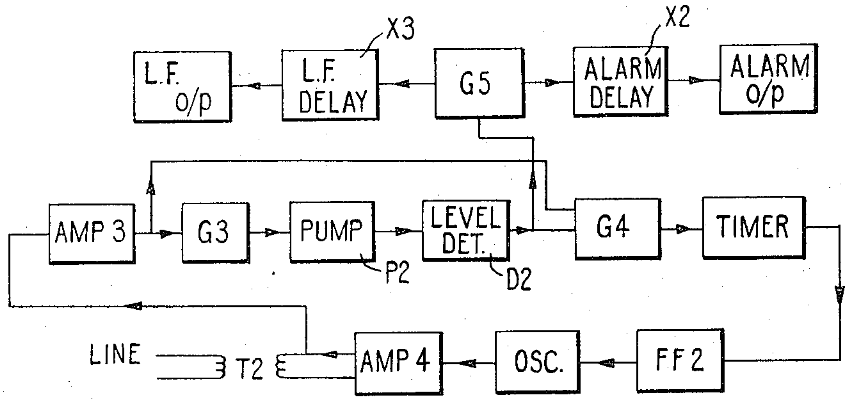

One example of the invention is shown in the accompanying drawings in which:

FIG. 1 is a block circuit diagram of a transponder connected to one end of a line at the protected premises in a security alarm system, and FIG. 2 is a block circuit diagram of a transponder connected to the other end of the line at a security control station.

Referring to FIG. 1 clock generation through gate G1 turns on a free running multivibrator FF1 for fixed transmission periods. The intervals between the transmission periods comprise receiving periods. The output from the flip-flop FF1 energises the oscillator S1 and the resulting bursts of pulses are amplified by the amplifier AMP1 before being fed to a transmission line L1 through transformer T1.

All the pulses received by the transformer T1 are further amplified and shaped by a second amplifier AMP2 and fed to a gate G2 together with an input from the gate G1. The presence of an output at G1 shuts the gate G2 so that whenever the flip-flop FF1 and the oscillator S1 are turned on the gate G2 is shut and a pump circuit P1 connected to the output of gate G2 is prevented from receiving the pulses being transmitted over the line.

During a receiving period, on the other hand, there is no output from G1 so that the gate G2 is open. The pump P1 therefore receives the incoming pulses and provided the correct number of pulses are received reaches a level at which it triggers a level detector D1. The resulting output from the level detector clears a delay circuit X1 which would otherwise feed a pulse to the bistable B/S1 to change its state and thereby energise a line fault indicator LF1.

Thus, in the absence of incoming pulses during a receiving period, there will be no output from the level detector D1 and the delay circuit X1 will operate the bistable B/S1 to indicate a line fault. The delay circuit may for example include a capacitor which is charged from a constant current source and which gives an output to the line fault indicator unless the capacitor is first discharged in response to the output from the level detector before it reaches a threshold level. The line fault is latched and requires a reset to the bistable after normal operation has been restored and incoming pulses are again being received.

An alarm input to the gate G1 inhibits the clock so that the flip-flip FF1 and oscillator S1 remain turned on and the bursts of pulses are transmitted through the transformer T1 continuously.

Referring next to FIG. 2, incoming pulses from the transponder illustrated in FIG. 1 are received by a transformer T2 and amplified and shaped by an amplifier AMP3. The output of amplifier AMP3 is fed to a gate G3 and to a gate G4. Gate G3 is open so that the pulses are fed to a pump circuit P2. After the pump has received a predetermined number of pulses it triggers a level detector Dr. The output from the level detector enables a gate G5 which feeds a clearing signal to the line fault indicator delay circuit X3 which would otherwise produce a line fault indication. If incoming pulses continue to be received, the output of the level detector remains in its triggered state and the sustained signal through gate G5 prevents cancellation of the alarm delay circuit X2 so that an alarm output is energised.

The output of the level detector D2 is also fed to a gate G4 which provides an output only when the level detector has been operated and when the incoming pulses through AMP3 have ceased. This output operates a timer which in turn operates a free running multivibrator FF2 controlling an oscillator S2. The resulting bursts of pulses are amplified through AMP4, and fed back down the transmission line through the transformer T2.

During operation of the timer the gate G3 is shut to prevent the outgoing pulses from getting through to the pump P2.

Apart from making it extremely difficult to simulate a line fault, a further advantage of the closed loop system is that it provides a two-way communication link which can be used for many different purposes. It would be possible, for example, to receive audio information transmitted either way along the line by merely plugging in a conventional head-set at the appropriate end. If necessary, multiplexed coded information could also be transmitted in either direction.

We claim:

1. A data signalling system including a transponder at one end of a transmission line, a transmitter for transmitting a call signal along the transmission line to the transponder during predetermined intermittent transmission periods, the transponder including means responsive to the incoming call signals during each transmission period for transmitting a corresponding answer signal back along the transmission line in the opposite direction in the gap before the next transmission period; a first line fault indicator at the transmitter end of the transmission line, means for inhibiting actuation of the indicator in response to the reception of a correct answer signal in each gap between the transmission periods, a second line fault indicator at the other end of the transmission line, and means for inhibiting actuation of the second indicator only in response to reception of a correct call signal during each transmission period whereby a genuine line fault is detected by the absence of an incoming signal at both ends of the line.

2. A data signalling system according to claim 1, in which each call signal and each answer signal comprises intermittent bursts of pulses, and both the transmitter and the transponder include a diode pump integrator circuit for generating an output whenever a predetermined number of pulses have been received and a delay circuit connected between the output of the respective pulse circuits and the respective line fault indicators, and means responsive to the output of the pump circuits for clearing the respective delay circuits to prevent operation of the respective line fault indicators when the output of the pump circuit reaches a predetermined level.

3. A data signalling system according to claim 2, in which the transponder further includes a timer for controlling the transmission period of the answer signal, the timer being energised in response to the output of the pump circuit in the transponder.

4. A data signalling system according to claim 3, in which the transponder further includes an alarm indicator and an alarm delay circuit, and means for clearing the delay circuit to prevent operation of the alarm indicator in response to the absence of further pulses following the said predetermined number of incoming pulses in a transmission period whereby the presence of further pulses generates an alarm output.

* * * * *